United States Patent
Gu et al.

(10) Patent No.: US 11,207,781 B2
(45) Date of Patent: Dec. 28, 2021

(54) METHOD FOR INDUSTRIAL ROBOT COMMISSIONING, INDUSTRIAL ROBOT SYSTEM AND CONTROL SYSTEM USING THE SAME

(71) Applicant: ABB Schweiz AG, Baden (CH)

(72) Inventors: Hao Gu, Shanghai (CN); Qingwei Li, Shanghai (CN); Jinsong Li, Beijing (CN); Jihuan Tian, Shanghai (CN); Liwei Qi, Shanghai (CN); Jianjiang Wang, Jiangsu (CN)

(73) Assignee: ABB Schweiz AG, Baden (CH)

( * ) Notice: Subject to any disclaimer, the term of this patent is extended or adjusted under 35 U.S.C. 154(b) by 129 days.

(21) Appl. No.: 16/674,916

(22) Filed: Nov. 5, 2019

(65) Prior Publication Data
US 2020/0061837 A1   Feb. 27, 2020

Related U.S. Application Data

(60) Division of application No. 15/719,243, filed on Sep. 28, 2017, now Pat. No. 10,786,904, which is a
(Continued)

(51) Int. Cl.
*B25J 9/16* (2006.01)
*B25J 11/00* (2006.01)
(Continued)

(52) U.S. Cl.
CPC ............. *B25J 9/1692* (2013.01); *B25J 9/161* (2013.01); *B25J 11/00* (2013.01);
(Continued)

(58) Field of Classification Search
CPC .......... B25J 9/1692; B25J 9/161; B25J 11/00; G05B 19/4015; G05B 19/4147;
(Continued)

(56) References Cited

U.S. PATENT DOCUMENTS

| | | |
|---|---|---|
| 6,044,308 A | 3/2000 | Huissoon |
| 7,979,159 B2 | 7/2011 | Fixell |
| | (Continued) | |

FOREIGN PATENT DOCUMENTS

| | | |
|---|---|---|
| CN | 102015221 A | 4/2011 |
| CN | 103538061 A | 1/2014 |
| | (Continued) | |

OTHER PUBLICATIONS

European Patent Office, Extended European Search Report issued in corresponding European application No. 15886965.1, dated Sep. 17, 2019, 12 pp.

(Continued)

*Primary Examiner* — Bao Long T Nguyen
(74) *Attorney, Agent, or Firm* — Greenberg Traurig, LLP

(57) ABSTRACT

Disclosed are systems and methods to provide a method for calibrating a touchscreen coordinate system of a touchscreen with an industrial robot coordinate system of an industrial robot for industrial robot commissioning and industrial robot system and control system using the same. In one form the systems and methods include attaching an end effector to the industrial robot; (a) moving the industrial robot in a compliant way until a stylus of the end effector touches a point on the touchscreen; (b) recording a position of the stylus of the end effector in the industrial robot coordinate system when it touches the point of the touchscreen; (c) recording a position of the touch point on the touchscreen in the touchscreen coordinate system; and calculating a relation between the industrial robot coordinate system and the touchscreen coordinate system based on the at least three positions of the end effector stylus and the at least three positions of the touch points.

8 Claims, 8 Drawing Sheets

Related U.S. Application Data continuation of application No. PCT/CN2015/075792, filed on Apr. 2, 2015.

(51) Int. Cl.
   *G05B 19/401* (2006.01)
   *G05B 19/414* (2006.01)

(52) U.S. Cl.
   CPC ...... *G05B 19/4015* (2013.01); *G05B 19/4147* (2013.01); *G05B 2219/39021* (2013.01); *G05B 2219/39024* (2013.01); *G05B 2219/39032* (2013.01)

(58) Field of Classification Search
   CPC ........... G05B 2219/39021; G05B 2219/39024; G05B 2219/39016; G05B 2219/39022; G05B 2219/39032; G06F 3/0418
   See application file for complete search history.

(56) References Cited

U.S. PATENT DOCUMENTS

| | | | |
|---|---|---|---|
| 2004/0078114 A1* | 4/2004 | Cordell | G05B 19/425 700/258 |
| 2011/0066393 A1 | 3/2011 | Groll et al. | |
| 2012/0146956 A1* | 6/2012 | Jenkinson | G06F 3/0418 345/178 |
| 2013/0342468 A1 | 12/2013 | Hekstra | |
| 2014/0229005 A1 | 8/2014 | Suzuki | |
| 2014/0286565 A1 | 9/2014 | Ikenaga et al. | |
| 2014/0309775 A1 | 10/2014 | Jenkinson | |
| 2015/0123923 A1 | 5/2015 | Stern | |

FOREIGN PATENT DOCUMENTS

| | | |
|---|---|---|
| CN | 104057455 A | 9/2014 |
| DE | 102012019347 A1 | 4/2014 |
| EP | 1120204 A2 | 8/2001 |
| EP | 1647369 A2 | 4/2006 |
| KR | 101349862 B1 | 1/2014 |
| WO | 2004108363 A1 | 12/2004 |
| WO | 2006079617 A1 | 8/2006 |
| WO | 2012062374 A1 | 5/2012 |
| WO | 2014161603 A1 | 10/2014 |

OTHER PUBLICATIONS

International Search Report and Written Opinion, International Patent Application No. PCT/CN2015/075792, ABB Technology Ltd., et al, dated Dec. 29, 2015, 9 pages.

European Patent Office, Supplementary European Search Report issued in corresponding Application No. 15886965.1, dated Apr. 15, 2019, 11 pp.

Chinese Patent Office, First Office Action issued in corresponding Chinese application No. 201580077848.7 , dated Nov. 18, 2019, 12 pp.

Chinese Patent Office, Search Report issued in corresponding Chinese application No. 201580077848.7 , dated Oct. 29, 2019, 5 pp.

The State Intellectual Property Office of People's Republic of China, Second Office Action issued in corresponding Chinese application No. 2015800778487, dated Mar. 9, 2020, 7 pp.

European Communication pursuant to Article 94(3) EPC, issued by the European Patent Office, regarding corresponding patent application Serial No. EP15886965.1; dated Jul. 23, 2021; 4 pages.

* cited by examiner

METHOD FOR INDUSTRIAL ROBOT COMMISSIONING, INDUSTRIAL ROBOT SYSTEM AND CONTROL SYSTEM USING THE SAME

TECHNICAL FIELD

The invention relates to programme-controlled industrial robot, and in particular to method for industrial robot commissioning, industrial robot system and control system using the same.

BACKGROUND ART

Industrial robot commissioning is tedious, repeated, operator-dependent in current robot applications. In particular, it takes considerable engineering time and effort in robot cell setup, recover, and duplication. Many solutions have been proposed for industrial robot commissioning, and various solutions are designed for various commissioning tasks, such as tool centre point (TCP) calibration, work object calibration, robot kinematics calibration, hand-eye calibration and path generation and tuning.

Patent WO 2006079617 A1 discloses TCP calibration device for robot with tool having calculation module that calculates position of center point of robot tool based on determined positions. The device has a camera for capturing images of a robot tool for multiple different tool orientations, and an image-processing unit for determining the positions of the robot tool in orientations based on images. A calculation module calculates the position of the centre point of robot tool based on determined positions.

For performance of a different task of absolute accuracy calibration, for example optimizing kinematics parameters of industrial robot Patent EP 1120204 A2 teaches an industrial robot calibration involves moving the robot to three or more reference markers with known absolute coordinates using a measurement stylus that is calibrated relative to the robot base and determining the robot's pose using the reference markers. The relative coordinates of the robot for the reference markers are transformed into absolute coordinates by coordinate transformation.

A further different task is concerned with hand-eye calibration a fixed camera configuration in a robot cell. The goal is to figure out the position and orientation relation between the camera and industrial robot base. Patent WO 2014161603 A1 describes in its Background of the invention portion that a traditional approach to determine the extrinsic parameters of the camera is to calibrate the camera towards a 2D (two dimensional) checkerboard. A corresponding frame is then manually pointed out by first defining a robot TCP (Tool Center Point) and then jogging the pointing tool to points of the checkerboard that define the work object. A relationship between the coordinate system of the camera and the coordinate system of the robot can then be determined.

Still another different task relates to path generation and tuning by industrial robot programming. WO 2004108363 A1 talks about fine tuning for e.g. industrial robot by adjusting fine tuning coordinate system based on difference between pose obtained after running the program instructions and the desired pose. A selected pose is calculated in a fine tuning coordinate system before producing instructions for selected pose in the system. The program instructions are run by the robot before determining the difference between pose obtained after running the program instructions and, the desired pose. The fine tuning coordinate system is adjusted based on the difference.

An industrial robot commissioning system for a multiple of tasks is desirable. For example, a commissioning engineer would like to see functionalities for various commissioning tasks, as the TCP calibration, absolute accuracy calibration, hand-eye calibration and path generation and tuning, are implemented in one industrial robot cell. However, a mere juxtaposition of the various systems for various commissioning tasks in the one robot cell has disadvantages as relatively high system complexity and cost. In addition, the robot cell occupies a relatively large space putting the various commissioning systems together.

BRIEF SUMMARY OF THE INVENTION

According to one aspect of present invention, it provides a method for calibrating a touchscreen coordinate system of a touchscreen with an industrial robot coordinate system of an industrial robot for industrial robot commissioning, wherein: the touchscreen is arranged in a working range of the industrial robot, including: attaching an end effector to the industrial robot; (a) moving the industrial robot in a compliant way until a stylus of the end effector touches a point on the touchscreen; (b) recording a position of the stylus of the end effector in the industrial robot coordinate system when it touches the point of the touchscreen; (c) recording a position of the touch point on the touchscreen in the touchscreen coordinate system; repeating the steps of (a), (b) and (c) for at least another two touches on the touchscreen, wherein two of the at least three touch points define a line parallel to X axis or Y axis of the industrial robot, coordinate system and another of the at least three touch points is arranged away from the line; and calculating a relation between the industrial robot coordinate system and the touchscreen coordinate system based on the at least three positions of the end effector stylus and the at least three positions of the touch points.

The calibrated touchscreen is suitable to be used as a versatile tool for various sorts of industrial robot commissioning, for example absolute accuracy calibration, hand-eye calibration and path generation and tuning. It is helpful for increasing the integration degree of the industrial robot system, reducing the system complexity and cost. This can be particularly useful where industrial robot absolute accuracy in a compact local working area is particularly important for the purpose of small part assembly.

According to another aspect of present invention, it provides a method for calibrating a tool centre point of a tool attached to an industrial robot with an industrial robot coordinate system of the industrial robot, wherein: a touchscreen is arranged in a working range of the industrial, including: (d) moving the industrial robot in a compliant way until the tool centre point of the tool touches a point on the touchscreen; (e) recording a posture of the industrial robot in the industrial robot coordinate system when it touches the point of the touchscreen; (f) recording a position of the touch point on the touchscreen in the touchscreen coordinate system; repeating the steps of (d), (e) and (f) for at least another two touches on the touchscreen, wherein the tool is arranged in different poses when it touches the touchscreen; and calculating a position of the tool centre point in the industrial robot coordinate system based on the at least three postures of the industrial robot and the at least three positions of the touch points.

According to another aspect of present invention, it provides a method for optimizing kinematics parameters of another industrial robot, wherein: a touchscreen is arranged in a working range of the another industrial robot and a touchscreen coordinate system of the touchscreen was calibrated with the industrial robot coordinate system of the industrial robot according to the previous method for calibrating a touchscreen coordinate system of a touchscreen with an industrial robot coordinate system, including: attaching an end effector to the another industrial robot whose base is arranged at the same position as the industrial robot; (g) moving the another industrial robot in a compliant way until a stylus of the end effector touches a point on the touchscreen; (h) recording a posture of the another industrial robot in the industrial robot coordinate system when the end effector stylus touches a point on the touchscreen; (i) recording a position of the touch point on the touchscreen in the touchscreen coordinate system; repeating steps of (a), (h) and (i) for at least another touch on the touchscreen, wherein the number of the touch is equal or above the number of the kinematics parameter of the another industrial robot; optimizing kinematics parameters of the another industrial robot based on the at least two postures of the another industrial robot, the at least two positions of the touch points, and the relation between the industrial robot coordinate system and the touch screen coordinate system.

According to another aspect of present invention, it provides a method for calibrating a camera coordinate system of a camera with an industrial robot system of an industrial robot, wherein: a touchscreen is arranged in a working range of the industrial robot and a touchscreen coordinate system of the touchscreen was calibrated with an industrial robot coordinate system of the industrial robot according to the previous method for calibrating a touchscreen coordinate system of a touchscreen with an, industrial robot coordinate system, including: (j) displaying a pattern on the touchscreen; (k) determining a position for a point on the image in the touchscreen coordinate system; (l) photographing an image of the pattern; (m) determining a position for the point on the image in the camera coordinate system; repeating steps of (j), (k), (l) and (m) for the pattern rotated on the touchscreen at least once; calculating a relation between the camera coordinate system and the touchscreen coordinate system by means of image recognition based on the at least two photographed images; calculating a relation between the industrial robot coordinate system and the camera coordinate system based the relation between the camera coordinate system and the touchscreen coordinate system and the relation between the touchscreen coordinate system and the industrial robot coordinate system.

According to another aspect of present invention, it provides a method for programming an industrial robot, wherein: a touchscreen is arranged in a working range of the industrial robot and a touchscreen coordinate system of the touchscreen was calibrated with an industrial robot coordinate system of the industrial robot according to the previous method for calibrating a touchscreen coordinate system of a touchscreen with an industrial robot coordinate system, including: setting a target path on the touchscreen; recording positions of target points on the target path in the touchscreen coordinate system; calculating the industrial robot postures in the industrial robot coordinate system where the industrial robot is supposed to reach and move along the target path based on the position coordinates of the points on the target path in the touchscreen coordinate system, the relation between the industrial robot coordinate system and the touchscreen coordinate system, and kinematics model of the industrial robot; moving the industrial robot with the industrial robot postures set as target postures in a compliant way to touch the touchscreen; recording the positions of the touch points in the touchscreen coordinate system; calculating deviation information between the positions of target points and the positions of the touch points; and tuning the industrial robot based on the deviation information.

The implementation of the commissioning apparatus is not necessary to have big area. For example, a phone sized mobile device is qualified for tool centre point (TCP) calibration, work object calibration, robot kinematics calibration, hand-eye calibration and path generation and tuning. In addition, the touch probe is not necessary to have displacement measuring function. A retractable probe to trigger the touch panel is enough. So, the cost of the apparatus for cell calibration could be relatively low compared with a multi-task industrial robot commissioning system with juxtaposition of various systems for the multiple commissioning tasks. Furthermore, in robot cell design phase, it is not a big issue to have mechanical features for mounting the commissioning apparatus on the part holders (e.g. tray, fixture, tune table) and on the robot tool (e.g. gripper). Therefore, the commissioning apparatus can be attached onto the robot cell with a known mechanical constrains. Therefore, an automatic calibration can be conducted.

According to another aspect of present invention, it provides an industrial robot commissioning system including an industrial robot, an end effector and a touchscreen, wherein: the industrial robot, the end effector and the touchscreen are configured to execute the method according to any of the previous methods.

According to another aspect of present invention, it provides an industrial robot commissioning control system being adapted for controlling the industrial robot and the touchscreen to execute the method according to any of the previous methods.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
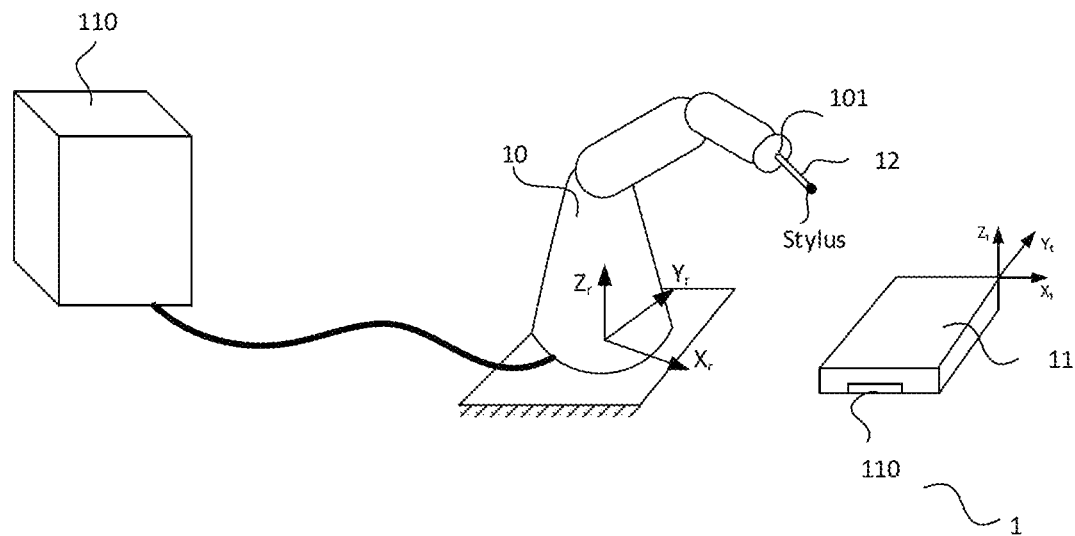
FIG. 1 illustrates an industrial robot commissioning system according to an embodiment of present invention.

FIG. 1 illustrates an industrial robot commissioning system according to an, embodiment of present invention. As shown in FIG. 1, the industrial robot system 1 includes an industrial robot 10 and a touchscreen 11. The posture, position and movement of the industrial robot 10 makes reference to an industrial robot coordinate system $x_r$, $y_r$, $z_r$, for example the base coordinate system of the industrial robot. The industrial robot 10 is provided with an industrial robot controller 100 including at least one processor, memory and communication means. In this example, the industrial robot controller 100 is utilized for carrying out most of the steps in the method according to the invention. The touchscreen 11 is an electronic visual display with touchscreen controller 110 that can read and record a touch position respect to touchscreen coordinate system $x_t$, $y_t$, $z_t$ by a stylus. The stylus can be electro-magnetic-based, ultrasonic-based, and mechanical-based. The touchscreen 11 can also display and to control how it is displayed. It is preferred that the touchscreen controller 110 has calculation power to run an APP. Preferably, regarding the measuring capability, a commercial available tablet from WACOM can reach 5 micrometre touch. The industrial robot controller 100 and the touchscreen controller 110 can communicate with each other via a communication link, which make up of industrial robot commissioning control system. An end effector 12 is attached to the industrial robot flange 101 in a known position with respect to the industrial robot coordinate system $x_r$, $y_r$, $z_r$, and the touchscreen 11 is arranged in the working range of the industrial robot 10 so that the end effector 12 can move with the industrial robot 10 and touch the touchscreen 11 when the industrial robot 11 assumes certain posture with preprogramed robot targets. The end effector 12 with the stylus to its end can be in a fixed relation to the industrial robot 100 with stylus electro-magnetic-based, ultrasonic-based, or mechanical-based, that can touch the touchscreen with electro-magnetic beam, ultrasonic beam or mechanical contact. Correspondingly, the touchscreen 11 can detect the electro-magnetic beam, ultrasonic beam or mechanical contact reading and recording the touch point. As compared with the end effector in fixed relation to the industrial robot 10, an alternative end effector is different in that its stylus can protrude with respect to the industrial robot 10.

The industrial robot system 1 must be automatic and accurate to get the stylus of the end effector 12 to touch the touchscreen 11. In order to achieve the automatic and accurate touch point, a soft and compliant control of the robot is, needed. In order to achieve such a soft and compliant control of the robot it is possible to use force control including a force/torque sensor. If force control is not included in the robot installation, it is possible to adapt the touchscreen controller 110 to send to the industrial robot controller 100 a signal indicating occurrence of the touch in order to move the robot into contact with the touchscreen 11, but still be compliant to find the exact accurate position of the touch point. Once the end effector 12 is in the touch position, the position data can be read within the touchscreen controller 110 and used together with the reference values for calculations of the relation between the industrial robot coordinate system $x_r$, $y_r$, $z_r$ and the touchscreen coordinate system $x_t$, $y_t$, $z_t$.

Touchscreen Calibration

Figure 2:
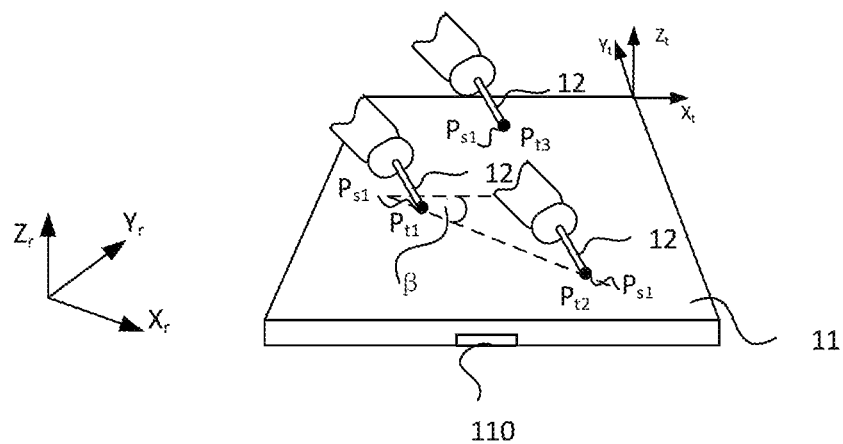
FIG. 2 illustrates the industrial robot moving the end effector during the calibration of the touchscreen coordinate system of a touchscreen with an industrial robot coordinate system of an industrial robot for industrial robot commissioning according to an embodiment of present invention.

FIG. 2 illustrates the industrial robot moving the end effector during the calibration of the touchscreen coordinate system of a touchscreen with an industrial robot coordinate system of an industrial robot for industrial robot commissioning according to an embodiment of present invention. The industrial robot controller 100 is programmed and control the industrial robot 10 to move in, a compliant way until the stylus of the end effector touches a point on the touchscreen 11, for example with soft servo. The stylus is calculated with built-in mathematics in the robot software in the robot coordinate system $x_r$, $y_r$, $z_r$. The industrial robot controller 100 can record a position $P_{s1}$ of the stylus of the end effector in the industrial robot coordinate system $x_r$, $y_r$, $z_r$ when it touches the point of the touchscreen 11. The touchscreen controller 110 can record a position $P_{t1}$ of the touch point on the touchscreen 11 in the touchscreen coordinate system $x_t$, $y_t$, $z_t$. The programed industrial robot controller 100 then control the industrial robot 10 to repeat the steps for at least another two touches on the touchscreen 11 with the stylus positions $P_{s2}$, $P_{s3}$ in the industrial robot coordinate system $x_r$, $y_r$, $z_r$ and touch point positions $P_{t2}$, $P_{t3}$ in the touchscreen coordinate system $x_t$, $y_t$, $z_t$, wherein two of the at least three touch points at $P_{t1}$, $P_{t2}$, $P_{t3}$ define a line parallel to X axis or Y axis of the industrial robot coordinate system $x_r$, $y_r$, $z_r$ and another of the at least three touch points at $P_{t1}$, $P_{t2}$, $P_{t3}$ is arranged away from the line. For example as shown in FIG. 2, two touch points at $P_{t1}$, $P_{t2}$, $P_{t3}$ define a line L parallel to X axis of the industrial robot coordinate system and the touch point at $P_{t3}$ is arranged away from the line L. The industrial robot controller 100 can calculate a relation between the industrial robot coordinate system $x_r$, $y_r$, $z_r$ and the touchscreen coordinate system $x_t$, $y_t$, $z_t$ based on the at least three positions $P_{s1}$, $P_{s2}$, $P_{s3}$ of the end effector stylus and the at least three positions $P_{t1}$, $P_{t2}$, $P_{t3}$ of the touch points. As an alternative, the touchscreen controller can do the calculation. In particular for example, by stylus positions $P_{s1}$, $P_{s2}$, $P_{s3}$, the plane equation of the touchscreen 11 can be obtained (Z axis direction) in with reference to the industrial robot coordinate system $x_r$, $y_r$, $z_r$. The line L defined by the positions $P_{t1}$, $P_{t2}$ with respect to the touchscreen coordinate system $x_t$, $y_t$, $z_t$ is along the X axis of the industrial robot coordinate system $x_r$, $y_r$, $z_r$, so the X axis of the touchscreen coordinate system $x_t$, $y_t$, $z_t$ can be identified with respect to the industrial robot coordinate system $x_r$, $y_r$, $z_r$ by sensing an angle β with respect to the touchscreen coordinate system $x_t$, $y_t$, $z_t$ between the line L and the X axis of the touchscreen coordinate system $x_t$, $y_t$, $z_t$. Picking one of the positions $P_{t1}$, $P_{t2}$, $P_{t3}$ of the touch point as the origin, for example $P_{t1}$, the touchscreen panel with respect to the industrial robot coordinate system $x_r$, $y_r$, $z_r$ is determined. Since the positions $P_{t1}$, $P_{t2}$, $P_{t3}$ of the touch point are known, a relation between the industrial robot coordinate system and, the touchscreen coordinate system can be determined by translating the origin.

In alternative embodiments, more than three touches can be applied. The extra touch points may be used for linear least-square fitting of the plane equation of the touch screen 11, and for least-square fitting of the line L equation if there are extra touch points along the line L.

The calibrated touchscreen is suitable to be used as a versatile tool for various sorts of industrial robot commissioning, for example absolute accuracy calibration, hand-eye calibration and path generation and tuning which will be described hereafter. It is helpful for increasing the integration degree of the industrial robot system, reducing the system complexity and cost. This can be particularly useful where industrial robot absolute accuracy in a compact local working area is particularly important for the purpose of small part assembly.

Robot Kinematics Calibration

Figure 3:
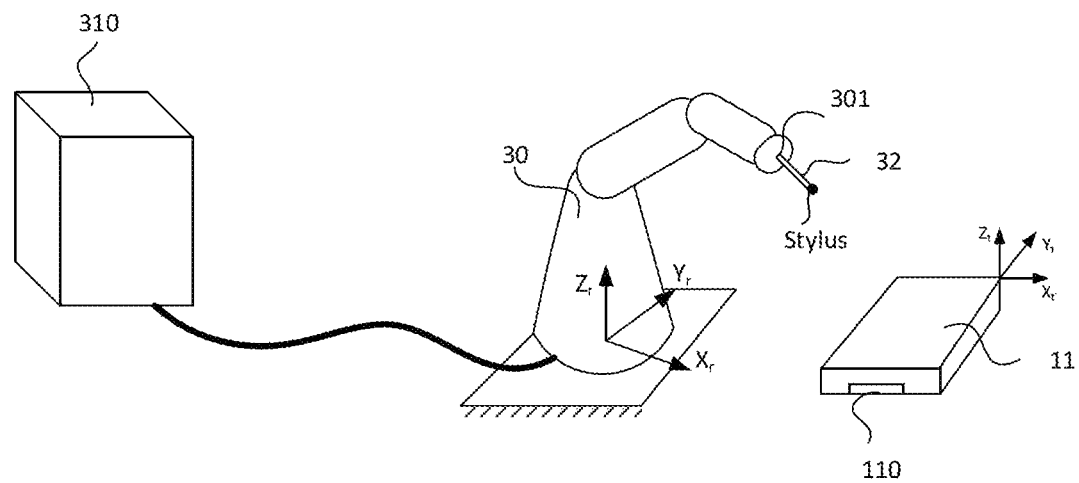
FIG. 3 illustrates optimizing kinematics parameters of another industrial robot by using the calibrated touchscreen according to an embodiment of present invention.

The 3D position obtained by the calibrated touchscreen can be used for identifying the robot kinematics parameters. FIG. 3 illustrates optimizing kinematics parameters of another industrial robot by using the calibrated touchscreen according to an embodiment of present invention. For example, the touchscreen coordinate system was calibrated with the industrial robot coordinate system according to the embodiment according to FIGS. 1 and 2. As shown in FIG. 3, the another industrial robot 30 is arranged substantially in the same place as the industrial robot 10 with respect to the calibrated touchscreen 11, thus the relation between the another industrial robot coordinate system and the touchscreen coordinate system is maintained as compared to that between the another industrial robot coordinate system and the touchscreen coordinate system as calculated in the preceding text. The touchscreen 11 is arranged in the working range of the another industrial robot 30 as well. An end effector 32 is attached to the another industrial robot flange 301. The end effector 12 or the like can be used for the end effector 32.

The another industrial robot controller 300 is programmed and control the another industrial robot 30 to move in a compliant way until the stylus of the end effector 32 touches a point on the touchscreen 11, for example with soft servo. The stylus is calculated with built-in mathematics in the robot software in the robot coordinate system $x_r$, $y_r$, $z_r$. The another industrial robot controller 300 can record a posture $POS_{r1}$ of the another industrial robot 30 in the industrial robot coordinate system $x_r$, $y_r$, $z_r$ when the stylus of the end effector 32 touches the point of the touchscreen 11. The touchscreen controller 110 can record a position $P'_{t1}$ of the touch point on the touchscreen 11 in the touchscreen coordinate system $x_t$, $y_t$, $z_t$. The programed another industrial robot controller 300 then controls the another industrial robot 30 to repeat the steps for at least another touches on the touchscreen 11, wherein the number of the touch is equal or above the number of the kinematics parameter of the another industrial robot 30. For example, if the another industrial robot has 4 kinematics parameters, then at least another three touches on the touchscreen 11 with the another industrial robot postures $POS_{r2}$, $POS_{r3}$, $POS_{r4}$ in the industrial robot coordinate system $x_r$, $y_r$, $z_r$ and touch point positions $P'_{t2}$, $P'_{t3}$, $P'_{t4}$ in the touchscreen coordinate system $x_t$, $y_t$, $z_t$. The another industrial robot controller 300 can optimize the kinematics parameters of the another industrial robot based on the at least two postures of the another industrial robot, the at least two positions of the touch points, and the relation between the industrial robot coordinate system and the touch screen coordinate system. In particular for example, the another industrial robot controller 300 can calculate the stylus position as Pi' with function of the robot DH parameters as at least N touches (N equals to the number of the interested kinematic parameters). Typically, a series robot can be described by Denavit Hartenberg (DH) model, which has four parameters for each robot link. Namely, link length, link offset, link twist, and joint angle. Therefore, a 6-Axis robot has 24 DH parameters in total. In case of calibration all the DH parameters, it requires at least 24 touches.

$$POS_n = f(DH)(i=1 \text{ to } n) \quad (1)$$

Where DH parameters are composed of link length a, link offset d, link twist α, and joint angle θ for each robot link.

With n preprogrammed targets, an optimization problem can be solved with an objective function as $$\min \Sigma \|POS_{ri} - POS_{rj}\| - |P'_{ti} - P'_{tj}\|, (i,j=1 \text{ to } n, i \neq j) \quad (2)$$

The optimized DH parameter will be the calibrated outputs for the robot kinematics.

After the robot kinematics calibration, the commissioning apparatus can be used for verifying the robot accuracy by touching the panel with alternative targets.

In alternative embodiments, more than three touches can be applied. The extra touch points may be used for non-linear least-square fitting for kinematics calibration to weaken the measuring error at one touch.

The calibrated touchscreen can be reused for absolute accuracy calibration without introducing additional hardware for robot kinematics calibration. It is helpful for increasing the integration degree of the industrial robot system, reducing the system complexity and cost. And the space occupation is reduced as well.

Hand-Eye Calibration

Figure 4:
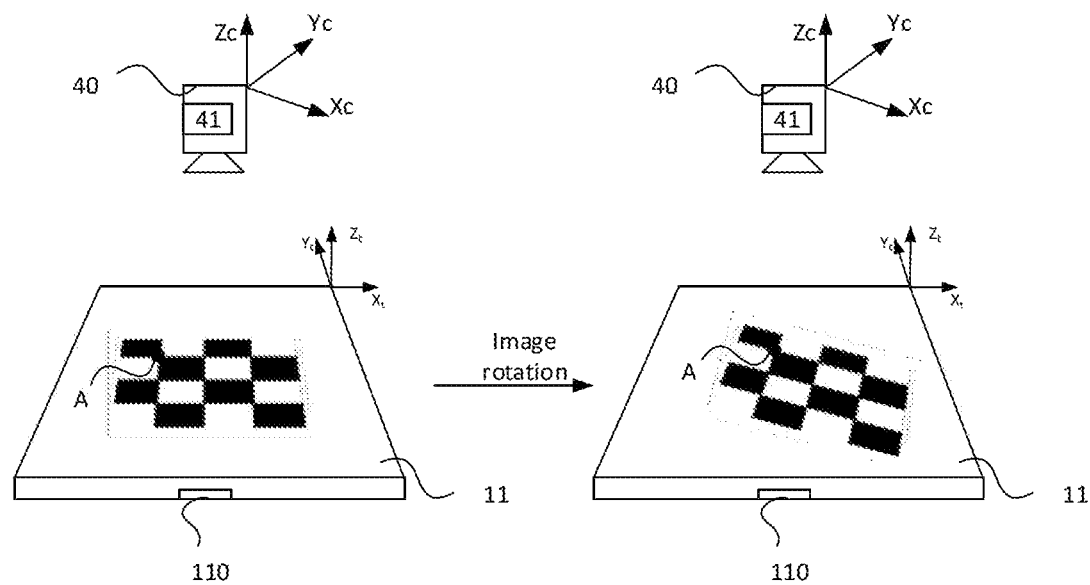
FIG. 4 illustrates calibrating a camera coordinate system of a camera with an industrial robot system of an industrial robot according to an embodiment of present invention.

The hand-eye calibration is for a fixed camera configuration in a robot cell. The goal is to figure out the position and orientation relation between the camera and robot base. The position obtained by the calibrated touchscreen can be used for hand-eye calibration. FIG. 4 illustrates calibrating a camera coordinate system of a camera with an industrial robot system of an industrial robot according to an embodiment of present invention. As shown in FIG. 4, the touchscreen 11 is arranged in the working range of the industrial robot 10 and the touchscreen coordinate system was calibrated with the industrial robot coordinate system according to the embodiment according to FIGS. 1 and 2. As an alternative, the industrial robot 10 can be replaced with another industrial robot that is arranged, substantially in the same place as the industrial robot 10 with, respect to the calibrated touchscreen 11, thus the relation between the another industrial robot coordinate system and the touchscreen coordinate system is maintained as compared to that between the another industrial robot coordinate system and the touchscreen coordinate system as calculated in the preceding text.

The touchscreen controller 110 can control to display a pattern on the touchscreen 11, for example in an appearance of a checkerboard. A camera 40 is configured to be directed to the touchscreen 11 arranged in the working range of the industrial robot 10. A camera controller 41 comprises a programming unit, e.g. a CPU, and a computer readable storage medium. The camera controller 41 is configured to control the camera to take a photo, receive information from the camera 41 in the form of an image of the pattern displayed on the touchscreen 11 and determine coordinates of a point of the image in a camera coordinate system $x_c$, $y_c$, $z_c$. The touchscreen controller 110 is configured to control the touchscreen 11 to display the pattern $PT_1$ on the touchscreen 11 and determine a position A for a point on the image in the touchscreen coordinate system. The camera controller 41 is configured to control the camera 41 to photograph an image of the pattern $PT_1$ and determine a position for the point A on the image in the camera coordinate system. The touchscreen controller 110 is configured to rotate the pattern at least once, and the rotated pattern is indicated by $PT_2$. The touchscreen controller 110 and the camera controller 41 are configured to control the touchscreen 11 and the camera 40 to repeat the steps for the rotated pattern $PT_2$. Thus, it is known of the coordinates for the point A with, respect to the touchscreen coordinate system $x_t$, $y_t$, $z_t$ and the camera coordinate system $x_c$, $y_c$, $z_c$, which can be transmitted to the industrial robot controller 100. The industrial robot controller 100 can calculate a relation between the camera coordinate system and the touchscreen coordinate system by means of image recognition based on the at least two photographed images, and further calculate a relation between the industrial robot coordinate system and the camera coordinate system based the relation between the camera coordinate system and the touchscreen coordinate system and the relation between the touchscreen coordinate system and the industrial robot coordinate system. There a number of algorithms for camera calibration based on known image pattern information as shown in FIG. 4. For example, one of the algorithms was discussed and published by article R. Y. Tsai, An Efficient and Accurate Camera Calibration Technique for 3D Machine Vision, Proc. of IEEE Conf Computer Vision, pages 364-374, 1986; another of the algorithmes was addressed by Paul Beardsley, David Murray, Andrew Zisserman, Camera Calibration Using Multiple Images, Computer Vision—ECCV'92 Lecture Notes in Computer Science Volume 588, pp 312-320, 1992; still another of the algorithms was disclosed by Douskos V., Kalisperakis I., Karras G., Automatic Calibration of Digital Cameras Using Planar Chess-board Patterns, Optical 3-D Measurement Techniques VIII, Wichman, vol. 1, pp. 132-140, 2007. Some algorithms are available as open source library or toolbox, such as OpenCV by Intel and initially released in June 2000 and stable released in October, 2014. Camera calibration with OpenCV was further described by paper—Y. M. Wang, Y. Li, and J. B. Zheng: A Camera Calibration Technique Based on OpenCV, 3rd International Conference on Information Sciences and Interaction Sciences (ICIS 2010), Chengdu, China, 2010. As an alternative, the touchscreen controller can do the calculation.

In alternative embodiments, more than twice rotations can be applied. The extra rotation may be used for non-linear least-square fitting for camera calibration to weaken the measuring error at one image recognition.

Figure 5:
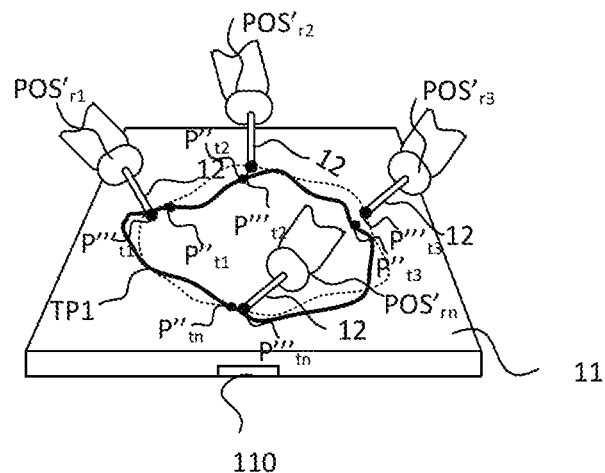
FIG. 5 illustrates programming an industrial robot for path generation and tuning, according to an embodiment of present invention.

It can be seen that besides behaving as a device for absolute accuracy calibration of an industrial robot, the calibrated touchscreen can be reused for hand-eye calibration of an industrial robot system as well. With the same calibrated touchscreen, a multiple of commissioning tasks can be achieved, such as absolute accuracy calibration and hand-eye calibration. No additional hardware dedicated to Hand-eye calibration is needed for the integration. Again, it is helpful for increasing the integration degree of the industrial robot system, reducing the system complexity and cost.
Path Generation and Tuning The 3D position obtained by the calibrated touchscreen can be used for robot path generation and tuning. FIG. 5 illustrates programming an industrial robot for path generation and tuning according to an embodiment of present invention. As shown in FIG. 5, the touchscreen 11 is arranged in the working range of the industrial robot 10 and the touchscreen coordinate system was calibrated with the industrial robot coordinate system according to the embodiment according to FIGS. 1 and 2. As an alternative, the industrial robot 10 can be replaced with another industrial robot that is arranged substantially in the same place as the industrial robot 10 with respect to the calibrated touchscreen 11, thus the relation between the another industrial robot coordinate system and the touchscreen coordinate system is maintained as compared to that between the another industrial robot coordinate system and the touchscreen coordinate system as calculated in the preceding text.

The touchscreen controller 110 can control to set a target path $TP_1$ on the touchscreen 11, for example a circle, a rectangle, a triangle, or in irregular shape. The touchscreen controller 110 is configured to record positions $P''_{t1}$, $P''_{t2}$, $P''_{t3}$ ... $P''_{tn}$ of target points on the target path $TP_1$ in the touchscreen coordinate system $x_t$, $y_t$, $z_t$. Since between the industrial robot coordinate system $x_r$, $y_r$, $z_r$ and the touchscreen coordinate system $x_t$, $y_t$, $z_t$ is known, the industrial robot controller 100 is configured to calculating the industrial robot postures $POS'_{r1}$ $POS'_{r2}$, $POS'_{r3}$ ... $POS'_{rn}$ in the industrial robot coordinate system $x_r$, $y_r$, $z_r$, where the industrial robot is supposed to reach and move along the target path $TP_1$ based the positions $P''_{t1}$, $P''_{t2}$, $P''_{t3}$ ... $P''_{tn}$ for the points on the target path in the touchscreen coordinate system, the relation between the industrial robot coordinate system and the touchscreen coordinate system, and kinematics model of the industrial robot. The industrial robot controller 100 then controls the industrial robot 10 to move with the industrial robot postures $POS'_{r1}$ $POS'_{r2}$, $POS'_{r3}$ ... $POS'_{rn}$ set as target postures in a compliant way to touch the touchscreen 11. The touchscreen controller 110 records the positions $P'''_{t1}$, $P'''_{t2}$, $P'''_{t3}$ ... $P'''_{tn}$ of the touch points in the touchscreen coordinate system $x_t$, $y_t$, $z_t$ and send them to the industrial robot controller 100. The industrial robot controller 100 calculate deviation information between the positions $P''_{t1}$, $P''_{t2}$, $P''_{t3}$ ... $P''_{tn}$ of target points and the positions $P'''_{t1}$, $P'''_{t2}$, $P'''_{t3}$ ... $P'''_{tn}$ of the touch points, and tuning the industrial robot based on the deviation information, for example by the equation as: $POS'_{ri}+(P''_{ti}-P'''_{ti})$, (i=1−n).

Besides the utilization as described by the embodiments of present invention, the calibrated touchscreen can be reused for path generation and tuning of an industrial robot system without running the commissioning program on a real work object, for example 3C product. With the same calibrated touchscreen, a multiple of commissioning tasks can be achieved, such as absolute accuracy calibration and hand-eye calibration. No additional hardware dedicated to path generation and tuning is needed for the integration. Again, it is helpful for increasing the integration degree of the industrial robot system, reducing the system complexity and cost.

An industrial robot path, especially an irregular path, is not easy to be programed, because it is composed of hundreds of targets linked with move. For the dispensing process, the path programing is even more difficult, since it also requires for specific height and tool orientations. It is not convenient to program the irregular path with offline tool, due to the difficulty to get the numerical description of the path, and the frequent changing of these paths. In dispensing for 3C products, the path pattern is randomly drawn by the process engineer with his experience. In order to solve such problem during robot path generation and tuning, the user can draw the target path $TP_1$ on the touchscreen 11, and the target path involved in the step of target path setting follows the target path drawn by the user. Based on the proposed easy robot commissioning apparatus, it is applicable to automatically program a path and quickly tune the practical path.

TCP Calibration

Figure 6:
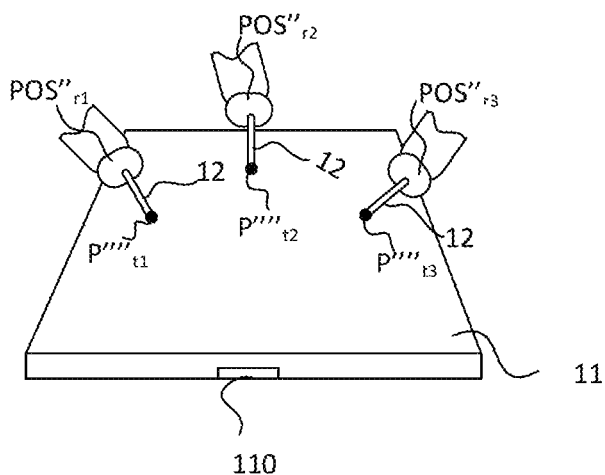
FIG. 6 illustrates calibration of a tool centre point of a tool attached to the industrial robot by using the industrial robot and the calibrated touchscreen according to an embodiment of present, invention.

FIG. 6 illustrates calibration of a tool centre point of a tool attached to the industrial robot by using the industrial robot and the calibrated touchscreen according to an embodiment of present invention. The tool 60 is attached to the industrial robot flange 101 in a fixed relation. The touchscreen 11 is arranged in the working range of the industrial robot 10 and the touchscreen coordinate system $x_t$, $y_t$, $z_t$, of the touchscreen 11 was calibrated, with the industrial robot coordinate system $x_r$, $y_r$, $z_r$ of the industrial robot 10 according to the solution as explained according to FIGS. 1 and 2. As shown in FIG. 6, the industrial robot controller 100 is programmed and control the industrial robot to move 10 in a compliant way until the TCP of the tool 60 touches a point on the touchscreen 11, for example with soft servo, when the tool 60 touches the touchscreen, a trigger signal will be sent to the industrial robot controller 100 for stopping the motion. The industrial robot controller 100 can record a posture $POS''_{r1}$ of the industrial robot 10 in the industrial robot coordinate system $x_r$, $y_r$, $z_r$ when it touches the point of the touchscreen 11. The touchscreen controller 110 can record a position $P''''_{t1}$ of the touch point on the touchscreen 11 in the touchscreen coordinate system $x_t$, $y_t$, $z_t$. The programed industrial robot controller 100 then control the industrial robot 10 to repeat the steps for at least another two touches on the touchscreen 11 with the industrial robot postures $POS''_{r2}$, $POS''_{r3}$ in the industrial robot coordinate system $x_r$, $y_r$, $z_r$ and touch point positions $P''''_{t2}$, $P''''_{t3}$ in the touchscreen coordinate system $x_t$, $y_t$, $z_t$, where the tool poses are different among each other when the industrial robot assumes the three postures $POS''_{r2}$, $POS''_{r2}$, $POS''_{r3}$. Then, the industrial robot controller 100 can calculate a position of the tool centre point in the industrial robot coordinate system $x_r$, $y_r$, $z_r$ based on the at least three postures of the industrial robot, the at least three positions of the touch points in the touchscreen coordinate system $x_t$, $y_t$, $z_t$, and the predetermined relation between the industrial robot coordinate system and the touch screen coordinate system. An exemplary algorithm is described thereafter. The touch point $P_i$ with respect to the industrial robot coordinate system can be presented as:

$$P_{ti}=R_{0i}\mathrm{TCP}+T_{0i} \quad (3)$$

where $R_{0i}$ is the rotating matrix of $TCP_0$ with respect to the industrial robot coordinate system, while $T_{0i}$, is the translation vector of $TCP_0$ with respect thereto. TCP represents the tool centre point with respect to the industrial robot flange 101. $TCP_0$ represents the posture of the industrial robot flange 101 with respect to the industrial robot coordinate system, and thus both of the $R_{0i}$ and $T_{0i}$ can be calculated from the industrial robot postures $POS''_{r1}$, $POS''_{r2}$, $POS''_{r3}$ with built-in mathematics in the robot software.

The 2D position of $P_1$ with respect to the touchscreen coordinate system is recorded, by the touchscreen controller 11. With n touching points, equations are obtained as $$(R_{0i}-R_{0j})\mathrm{TCP}=(P_{ti}-P_{tj})-(T_{0i}-T_{0j}) \; i,j=1 \text{ to } n, i\neq j \quad (4)$$

where $P_i-P_j$ is a known value thanks to the 2D measuring of the touchscreen from the positions of $P''''_{t1}$, $P''''_{t2}$, $P''''_{t3}$ with respect to the touchscreen coordinate system. Therefore, TCP can be solved as a linear equation.

In alternative embodiments, more than three touches can be applied. The extra touch points may be used for linear least-square fitting for calculating TCP.

To achieve robot commissioning as TCP calibration, the calibrated touchscreen is also applicable without using additional hardware dedicated to TCP calibration. Again, it is helpful for increasing the integration degree of the industrial robot system, reducing the system complexity and cost.

Figure 7:
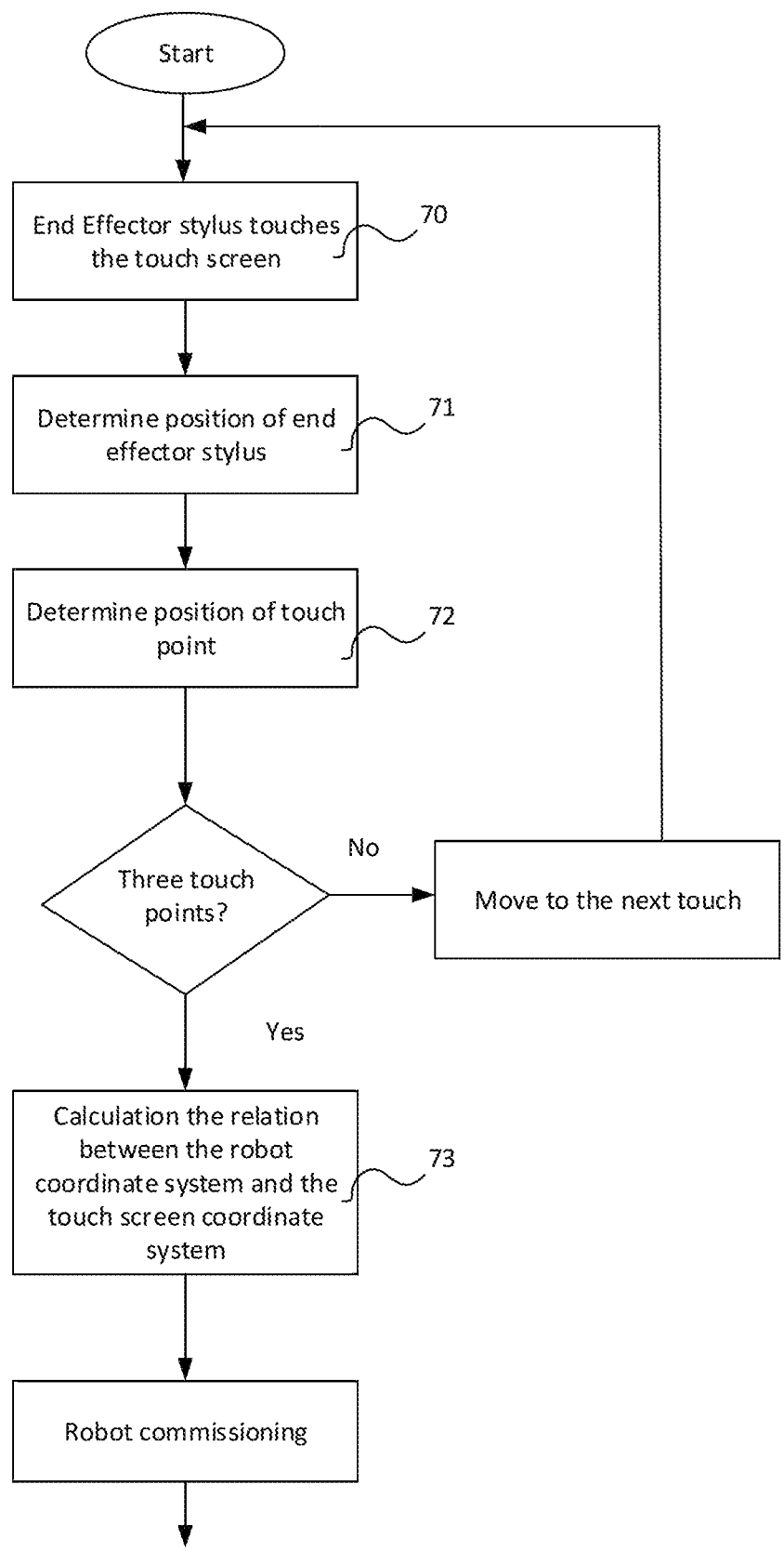
FIG. 7 shows a flow chart illustrating a calibration method for industrial robot commissioning according to an embodiment of present invention.

FIG. 7 shows a flow chart illustrating a calibration method for industrial robot commissioning according to an embodiment of present invention. It will be understood that each block of the flow chart can be implemented by computer program instructions.

In the following example, the touchscreen is located in the working range of the industrial robot with an end effector attached to the industrial robot flange as shown in FIG. 1. A point common to the industrial robot and the touchscreen has to be established. This means the industrial robot moves the stylus of the end effector in a compliant way until it touches the touch screen at a touch point, block 70. When the effector stylus touches the touchscreen, a position of the end effector stylus in relation to the industrial robot coordinate system has to be determined. This means that the stylus of the end effector is determined in relation to a tool coordinate system by known method, for example: a fixed probe is determined by the nominal mechanical relation as in design; a tractable probe is further calculated by sensing the tracked distance from the initial position of the nominal mechanical relation. The end effector coordinate system is known in relation to the industrial robot coordinated system, for example the base coordinate system of the industrial robot. When the end effector stylus has been determined, its position is known in the industrial robot system, and thus recorded in the industrial robot coordinate system, block 71. The position of the touch point in the touchscreen coordinate system has to be determined as well, block 72. The touch point position in the touchscreen coordinate system can be determined by any known touchscreen with the functionality of locating a touch point on its screen with respect to the touchscreen coordinate system, for example IPad. The skilled person shall understand that the sequence of blocks 71 and 72 can be reversed. The calibration algorithm of FIG. 2 requires position information concerning at least three touch points, the steps described in blocks 70, 71, 72 are repeated for at least the other two touches, wherein two of the at least three touch points define a line parallel to X axis or Y axis of the industrial robot coordinate system and another of the at least three touch points is arranged away from the line. When all of the at least three reference positions have been read and stored, the industrial robot controller calculates a relation between the industrial robot coordinate system and the touchscreen coordinate system based on the at least three positions of the end effector stylus and the at least three positions of the touch points, block 73. At first, the touch point positions are determined in the robot coordinate system based the measured robot positions, and the touch point positions are determined in the touchscreen coordinate system based on the measured touch points on the touchscreen. Thereafter, a relation is calculated between the industrial robot coordinate system and the touchscreen coordinate system based on the at least three positions of the touch points.

The relation between the industrial robot coordinate system and the touchscreen coordinate system can be used for robot commissioning, which will be described with examples thereafter involving FIGS. 8, 9 and 10.

Figure 8:
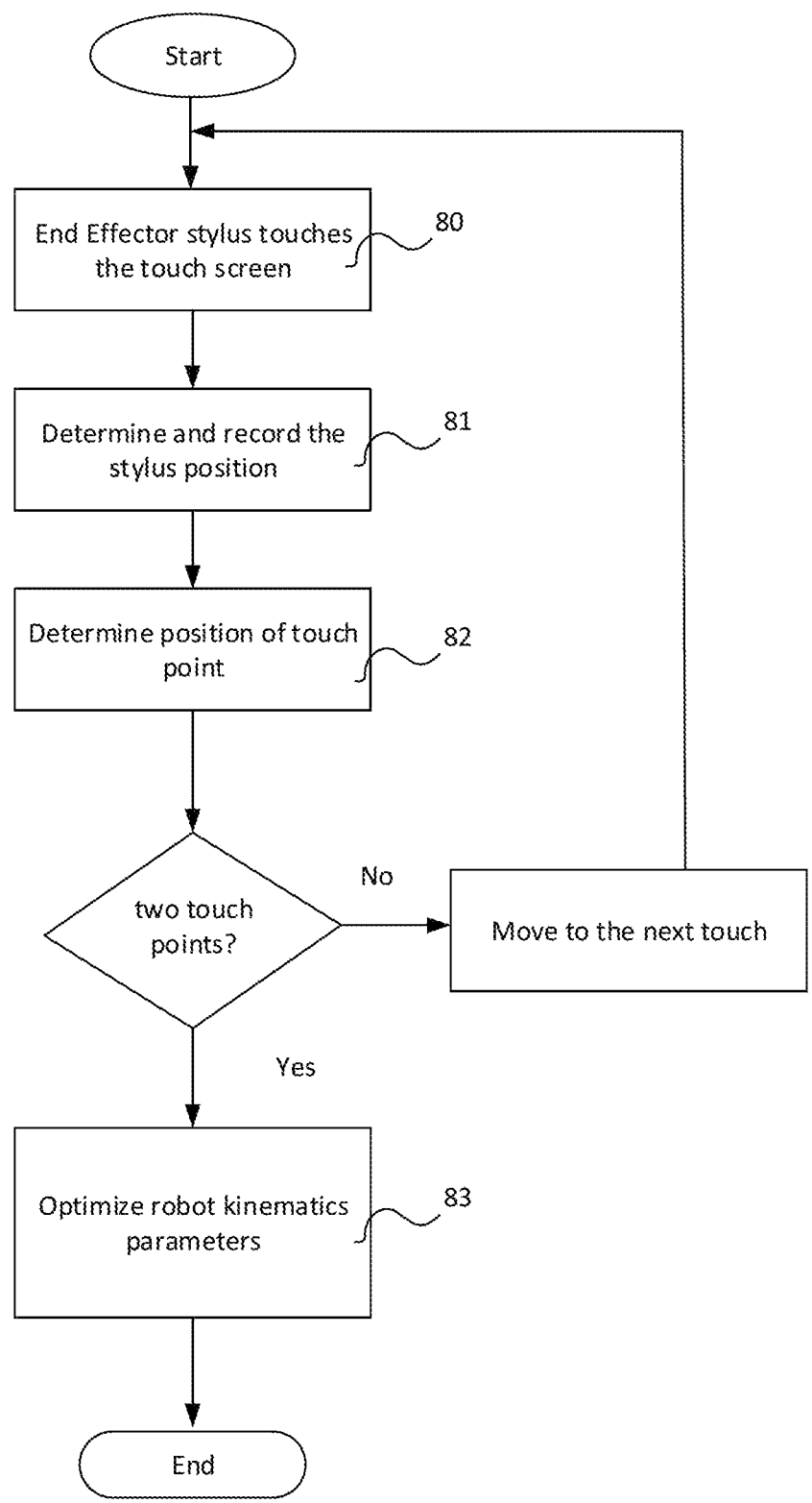
FIG. 8 shows a flow chart illustrating optimization of kinematics parameters of another industrial robot based on the method of FIG. 7.

FIG. 8 shows a flow chart illustrating optimization of kinematics parameters of another industrial robot based on the method of FIG. 7.

In the following example, the touchscreen is located in the working range of another industrial robot with an end effector attached to the industrial robot flange as shown in FIG. 3, where the industrial robot of FIG. 1 is replaced with the another industrial robot arranged substantially in the same place with the former with respect to the calibrated touchscreen. A point common to the another industrial robot and the touchscreen has to be established. This means the another industrial robot moves the stylus of the end effector in a compliant way until it touches the touch screen at a touch point, block 80. When the effector stylus touches the touchscreen, a posture of the end effector stylus in relation to the industrial robot coordinate system has to be determined. This means that the stylus of the end effector is determined in relation to an end effector coordinate system by known method, for example: a fixed probe is determined by the nominal mechanical relation as in design; a tractable probe is further calculated by sensing the tracked distance from the initial position of the nominal mechanical relation. The end effector coordinate system is known in relation to the industrial robot coordinated system, for example the base coordinate system of the industrial robot. When the end effector stylus has been determined, its position is known in the industrial robot system, and thus recorded in the industrial robot coordinate system, block 81. The position of the touch point in the touchscreen coordinate system has to be determined as well, block 82. The touch point position in the touchscreen coordinate system can be determined by any known touchscreen with the functionality of locating a touch point on its screen with respect to the touchscreen coordinate system, for example Iliad. The skilled person shall understand that the sequence of blocks 81 and 82 can be reversed. The calibration algorithm of FIG. 3 requires position information concerning at least two touch points, the steps described in blocks 80, 81, 82 are repeated for at least another touch, wherein the number of the touch is equal or above the number of the kinematics parameter of the another industrial robot. When all of the at least two reference positions have been read and stored, the industrial robot controller optimizes kinematics parameters of the another industrial robot based on the at least two postures of the another industrial robot, the at least two positions of the touch points, and the relation between the industrial robot coordinate system and the touch screen coordinate system, block 83.

Figure 9:
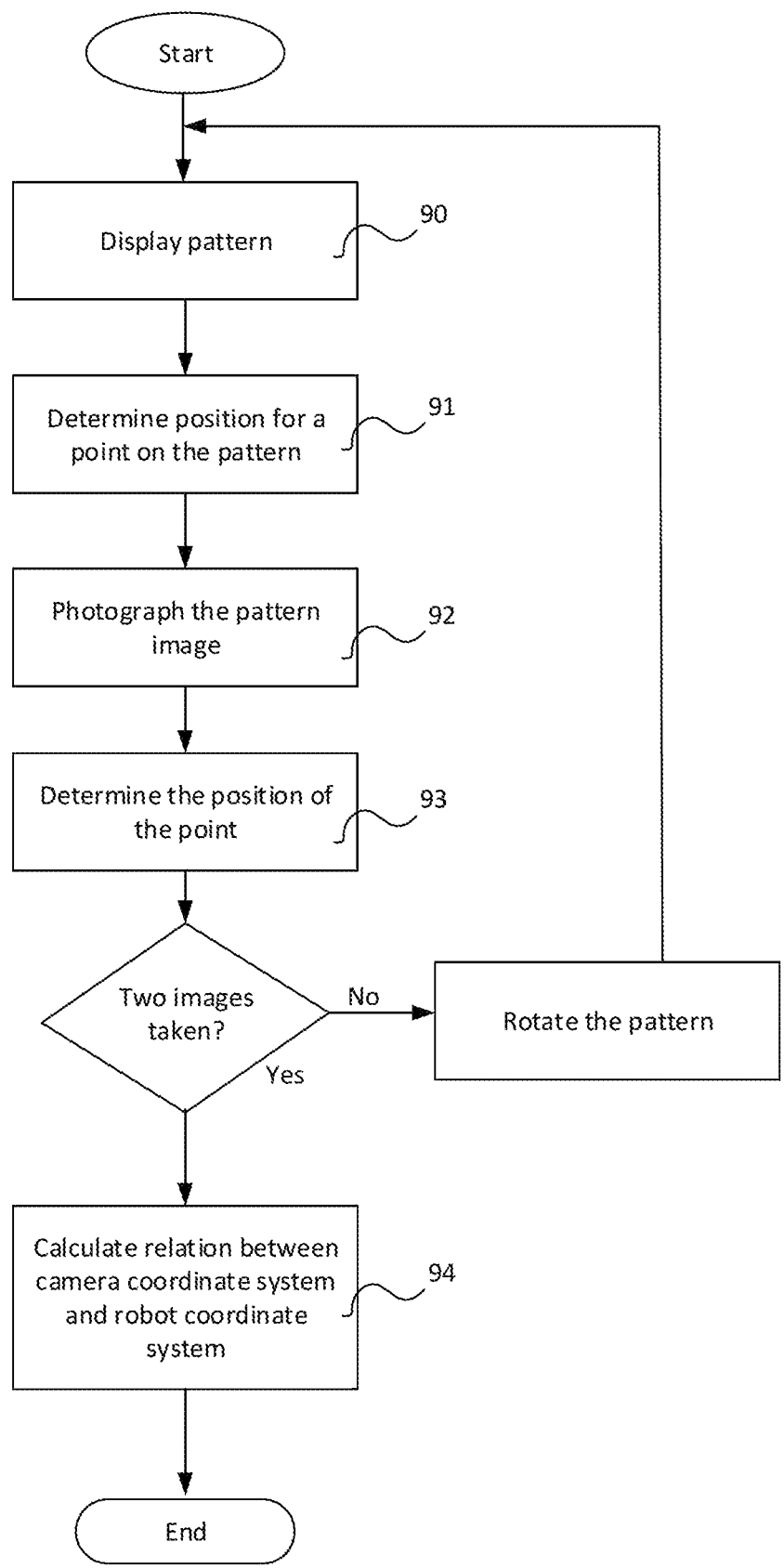
FIG. 9 shows a flow chart illustrating calibrating a camera coordinate system with the industrial robot coordinate system based on the method of FIG. 7.

FIG. 9 shows a flow chart illustrating calibrating a camera coordinate system with the industrial robot, coordinate system based on the method of FIG. 7.

In the following example, the touchscreen is located in the working range of the industrial robot as shown in FIG. 4. In order to establish the relation between the touchscreen coordinate system and the camera coordinate system a pattern is displayed on the touchscreen, for example a checker board, block 90. A position for a point on the image is determined in the touchscreen coordinate system, block 91. It is known that a touchscreen, for example like an IPad, has the functionality of locating a point displayed on its screen in the coordinate system of itself. When the pattern is displayed on the touchscreen, the camera photographs its image, block 92. In block 93, the camera controller determines the position of the point on the image in the camera coordinate system by known image recognition algorithm, such as In-sight Explorer by Cognex, and OpenCV by Itseez. In order to get sufficient information for the use of algorithm of FIG. 4, the camera has to take at least two pictures respectively for a pattern displayed on the touchscreen and another pattern appearing as a result of its rotation, thus r steps of in blocks 90, 91, 92 and 93 is repeated for the pattern rotated on the touchscreen at least once. When the positions for the point on the pattern and the rotated pattern are determined, the industrial robot calculates a relation between the industrial robot coordinate system and the camera coordinate system based the relation between the camera coordinate system and the touchscreen coordinate system and the relation between the touchscreen coordinate system and the industrial robot coordinate system, block 94.

Figure 10:
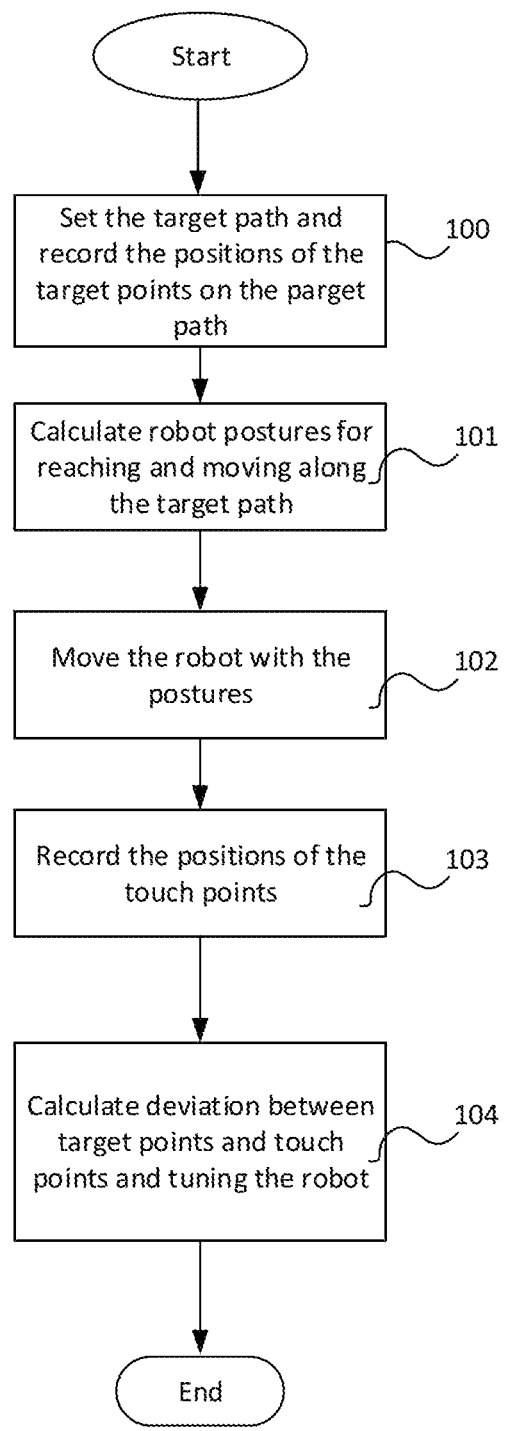
FIG. 10 shows a flow chart illustrating programming an industrial robot in a robot commissioning based on the method of FIG. 7.

FIG. 10 shows a flow chart illustrating programming an industrial robot in a robot commissioning based on the method of FIG. 7.

In the following example, the touchscreen is located in the working range of the industrial robot as shown in FIG. 5. It is known that tuning for industrial robot can be achieved by adjusting fine tuning coordinate system based on difference between postures obtained after running the program instructions and the desired postures. The desired postures have to be established on the target path. The touchscreen controller can set the target path on the touchscreen and record the positions of target points on the target path in the touchscreen coordinate system, block 100. As an alternative, in particular under the situation of an irregular target path, it is not easy to be programed for the touchscreen controller, because it is composed of hundreds of targets linked with move. The user can draw a desired path on the touchscreen and set the target path following the desired path as drawn by the user on the touchscreen. The touchscreen, as a means of Human Machine Interface, provides a functionality enabling the user to draw a target path as he wishes thereon, for example a target path on a 1:1 scaled part model. Then, a sequence of industrial robot postures has to be determined, assuming which the industrial robot is supposed to reach and move along the target path. The industrial robot controller can calculate the industrial robot postures in the industrial robot coordinate system where the industrial robot is supposed to reach and move along the target path based on the position coordinates of the points on the target path in the touchscreen coordinate system, the relation between the industrial robot coordinate system and the touchscreen coordinate system, and kinematics model of the industrial robot, block 101. This means that the target path is determined in the touchscreen coordinate system. The touchscreen coordinate system is known to the industrial robot coordinate system. When the target path has been determined, the postures of the industrial robot supposed for reaching and moving along the target path are known in the industrial robot coordinate system. When the sequence of postures involving the target path is determined, the industrial robot controller controls the industrial robot to move with the industrial robot postures set as target postures in a compliant way to touch the touchscreen, block 102. The touchscreen controller can record the positions of the touch points in the touchscreen coordinate system, block 103. Upon knowing the target path and the path as run by the industrial robot, the industrial robot controller can calculate deviation information between the positions of target points and the positions of the touch points, and tuning the industrial robot based on the deviation information using the algorithm as described for FIG. 5, block 104.

Figure 11:
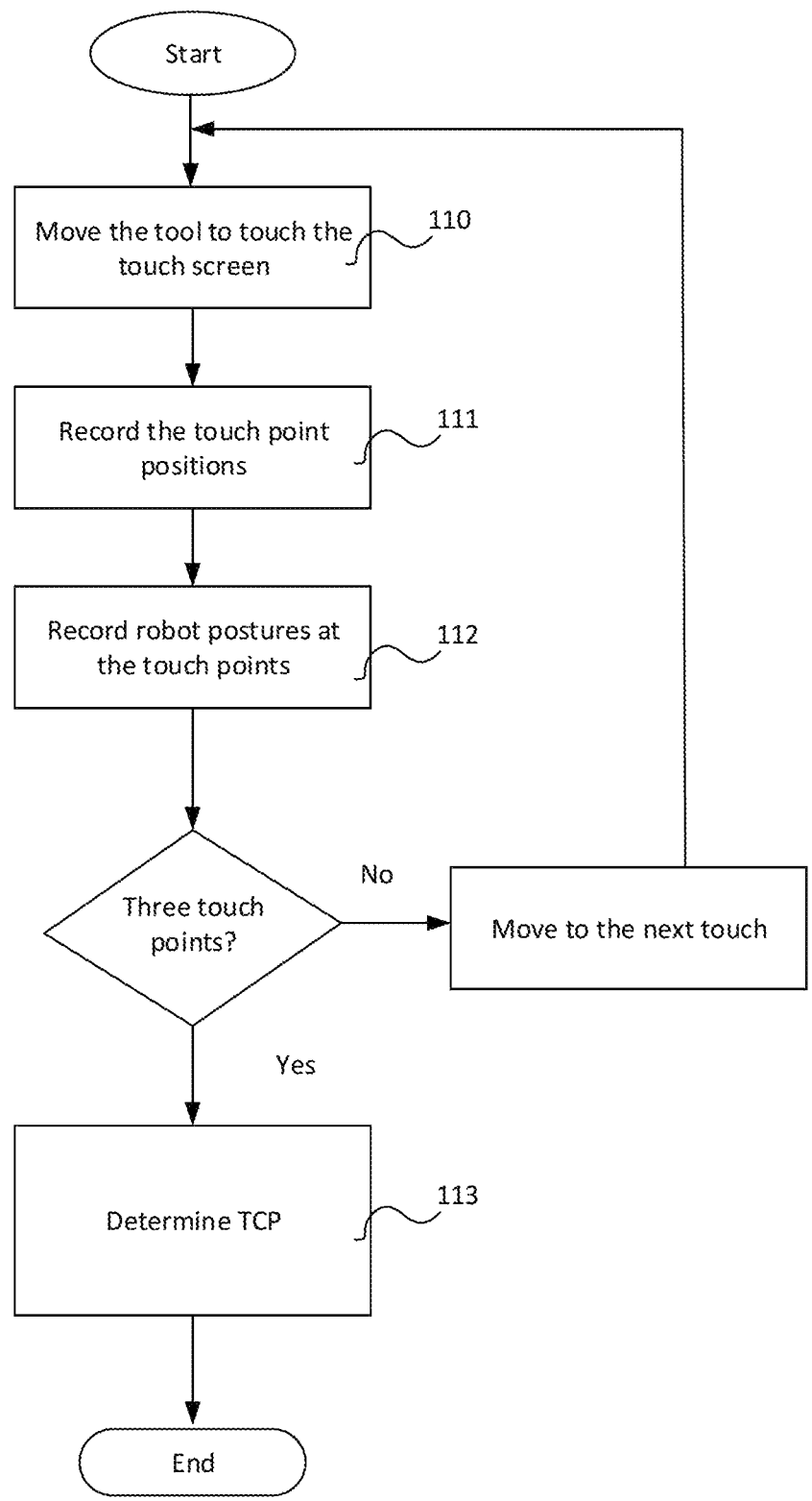
FIG. 11 shows a flow chart illustrating a TCP calibration method for industrial robot commissioning according to an embodiment of present invention.

FIG. 11 shows a flow chart illustrating a TCP calibration method for industrial robot commissioning according to an embodiment of present invention.

In the following example, the touchscreen is located in the working range of the industrial robot with a tool attached to the industrial robot flange as shown in FIG. 6. A point common to the industrial robot and the touchscreen has to be established. This means the industrial robot moves the tool center point (TCP) of the tool in a compliant way until it touches the touch screen at a touch point, block 110. When the TCP touches the touchscreen, the touchscreen controller records a position of the touch point on the touchscreen in the touchscreen coordinate system, block 111. The industrial robot controller records the posture of the industrial robot in the industrial robot coordinate system when it touches the point of the touchscreen as well, block 112. The skilled person shall understand that the sequence of blocks 111 and 112 can be reversed. The calibration algorithm of FIG. 6 requires position information concerning at least three touch points, the steps described in blocks 110, 111, 112 are repeated for at least another two touches, wherein the tool is arranged in different poses when it touches the touchscreen. When all of the at least three reference positions have been read and stored, the industrial robot controller calculates a position of the tool centre point in the industrial robot coordinate system based on the at least three postures of the industrial robot and the at least three positions of the touch points, block 113. The TCP is determined in the touchscreen coordinate system. The touchscreen coordinate system is known in relation to the industrial robot coordinate system. When the TCP has been determined in the touchscreen coordinate system, it is known in the industrial robot coordinate system. At first, the touch point positions are determined in the robot coordinate system based the measured robot positions, and the touch point positions are determined in the touchscreen coordinate system based on the measured touch points on the touchscreen. Thereafter, a position of the tool centre point in the industrial robot coordinate system based on the at least three postures of the industrial robot and the at least three positions of the touch points.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for calibrating a tool centre point of a tool attached to an industrial robot with an industrial robot coordinate system of the industrial robot, wherein a touchscreen is arranged in a working range of the industrial robot, the method comprising:
   (a) moving the industrial robot in a compliant way until a tool centre point of a tool attached to the industrial robot touches a touch point on the touchscreen;
   (b) recording a position of the tool centre point of the tool in the industrial robot coordinate system when the tool centre point touches the touch point of the touchscreen;
   (c) recording the position of the touch point on the touchscreen in a touchscreen coordinate system;
   repeating (a), (b), and (c) for at least two different touches on the touchscreen thereby being at least three different tool centre point positions at least three different touch points; and
   calculating a relation between the industrial robot coordinate system and the touchscreen coordinate system based on the at least three different tool centre point positions and the at least three different touch points;
   (d) moving the industrial robot in the compliant way until the tool centre point of the tool touches another touch point on the touchscreen;
   (e) recording a posture of the industrial robot in the industrial robot coordinate system when the tool centre point of the tool attached to the industrial robot touches the another touch point on the touchscreen;
   (f) recording a position of the another touch point on the touchscreen in the touchscreen coordinate system;
   repeating (d), (e), and (f) for at least another two touches of the tool centre point on the touchscreen, wherein the tool is arranged in different poses when the tool centre point of the tool attached to the industrial robot touches the touchscreen; and
   calculating a position of the tool centre point in the industrial robot coordinate system based on the relation, the at least three postures of the industrial robot and the at least three positions of the touch points.

2. An industrial robot commissioning system comprising:
   an industrial robot;
   an end effector; and
   a touchscreen,
   wherein:
   the industrial robot, the end effector, and the touchscreen are configured to:
   (a) move the industrial robot in a compliant way until a tool centre point of a tool attached to the end effector carried by the industrial robot touches a touch point on the touchscreen;
   (b) record a position of the tool centre point of the tool in the industrial robot coordinate system when the tool centre point touches the touch point of the touchscreen;
   (c) record the position of the touch point on the touchscreen in a touchscreen coordinate system;
   repeat (a), (b), and (c) for at least two different touches of the tool centre point on the touchscreen thereby being at least three different tool centre point positions at least three different touch points; and calculate a relation between the industrial robot coordinate system and the touchscreen coordinate system based on the at least three different tool centre point positions and the at least three different touch points;
   (d) move the industrial robot in the compliant way until the tool centre point of the tool touches a further touch point on the touchscreen;
   (e) record a posture of the industrial robot in the industrial robot coordinate system when the tool centre point touches the further touch point on the touchscreen;
   (f) record a position of the further touch point on the touchscreen in the touchscreen coordinate system;
   repeat (d), (e), and (f) for at least another two touches of the tool centre point on the touchscreen, wherein the tool is arranged in different poses when the tool centre point touches the touchscreen; and
   calculate a position of the tool centre point in the industrial robot coordinate system based on the relation, the at least three postures of the industrial robot and the at least three positions of the further touch points.

3. The industrial robot commissioning system according to claim 2, wherein:
   the end effector is in a fixed relation to the industrial robot.

4. The industrial robot commissioning system according to claim 3, wherein:
   the industrial robot is moved by means of force control.

5. The industrial robot commissioning system according to claim 2, wherein:
   the tool is a stylus of the end effector protruding with respect to the industrial robot.

6. The industrial robot commissioning system according to claim 2, wherein:
   the industrial robot is moved by means of force control.

7. The industrial robot commissioning system according to claim 2, further including:
   the touchscreen sending to the industrial robot a signal indicating occurrence of each of the touches.

8. An industrial robot commissioning control system being adapted for controlling an industrial robot via a touchscreen, the industrial robot commissioning control system configured to:
   (a) move the industrial robot in a compliant way until a tool centre point of a tool carried by the industrial robot touches a touch point on the touchscreen;
   (b) record a position of the tool centre point of the tool in the industrial robot coordinate system when the tool centre point touches the touch point of the touchscreen;
   (c) record the position of the touch point on the touchscreen in a touchscreen coordinate system;
   repeat (a), (b), and (c) for at least two different touches on the touchscreen thereby being at least three different tool centre point positions at least three different touch points; and
   calculate a relation between the industrial robot coordinate system and the touchscreen coordinate system based on the at least three different tool centre point positions and the at least three different touch points;
   (d) move the industrial robot in the compliant way until the tool centre point of the tool carried by the industrial robot touches another touch point on the touchscreen;
   (e) record a posture of the industrial robot in the industrial robot coordinate system when the tool centre point touches the another touch point on the touchscreen;
   (f) record a position of the another touch point on the touchscreen in the touchscreen coordinate system;
   repeat (d), (e), and (f) for at least another two touches on the touchscreen,
   wherein the tool is arranged in different poses when the tool centre point of the tool touches the touchscreen; and
   calculate a position of the tool centre point in the industrial robot coordinate system based on the relation, the at least three postures of the industrial robot, and the at least three positions of the touch points.

* * * * *